March 20, 1928.
E. F. PIERCE
LIQUID LEVEL GAUGE
1,663,484
Filed Sept. 26, 1925      3 Sheets-Sheet 1
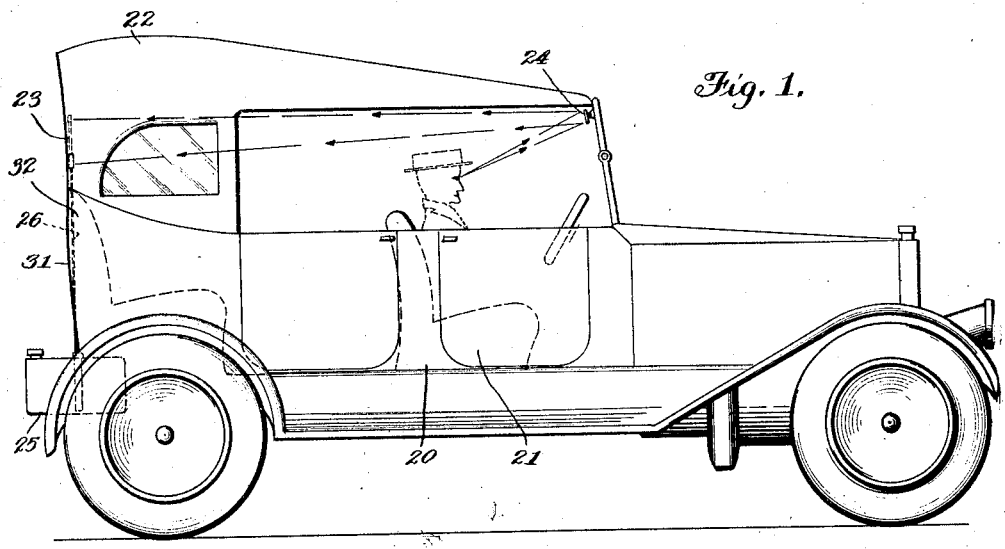
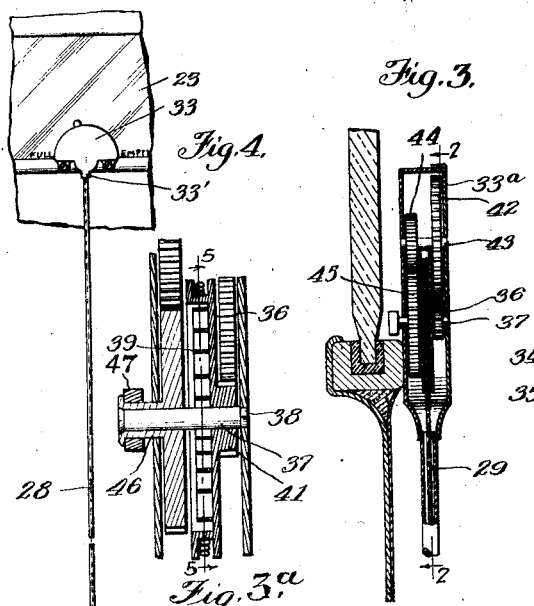
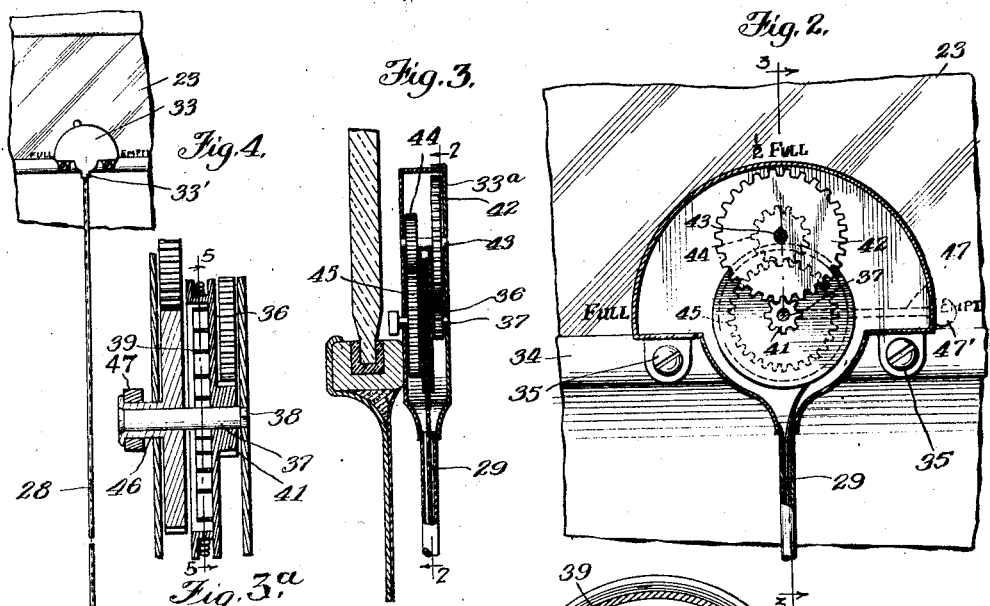
Inventor
Earl F. Pierce March 20, 1928.
E. F. PIERCE
LIQUID LEVEL GAUGE
Filed Sept. 26, 1925
1,663,484
3 Sheets-Sheet 2
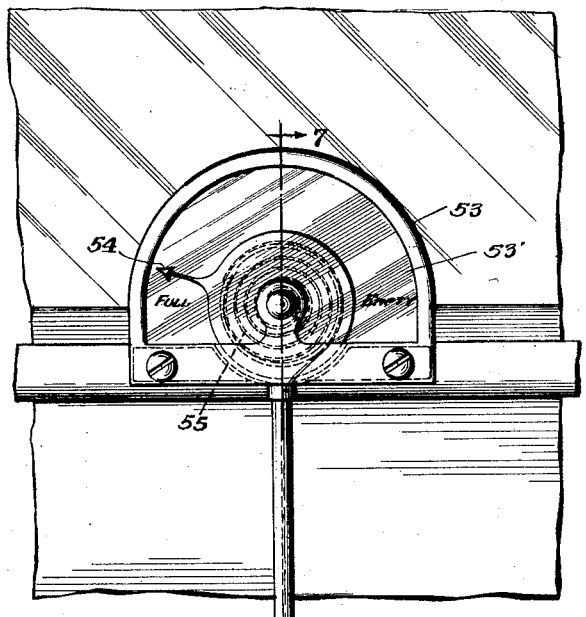
Fig. 6.
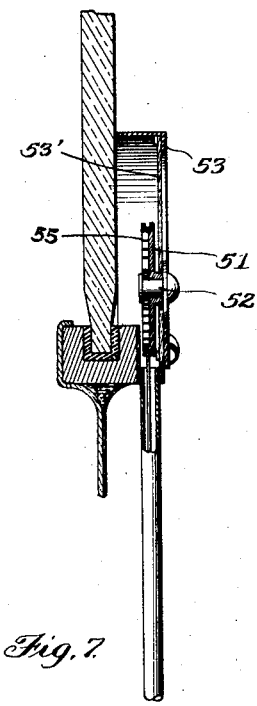
Fig. 7.
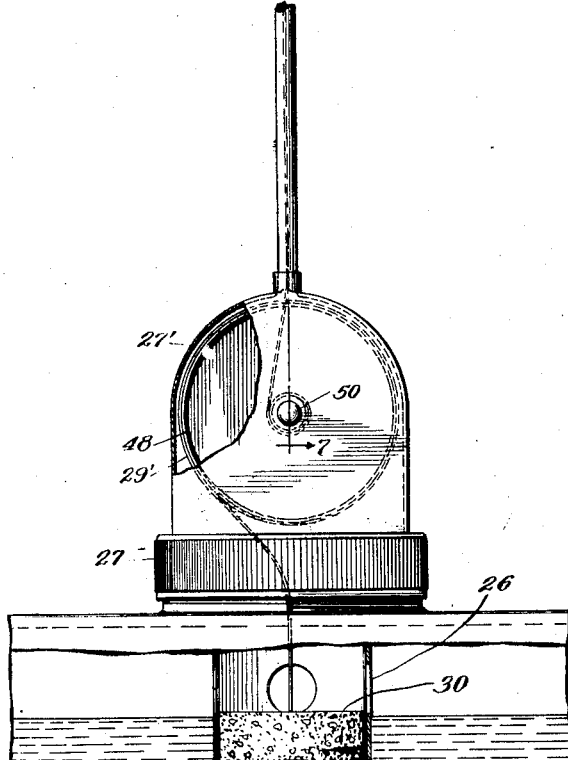
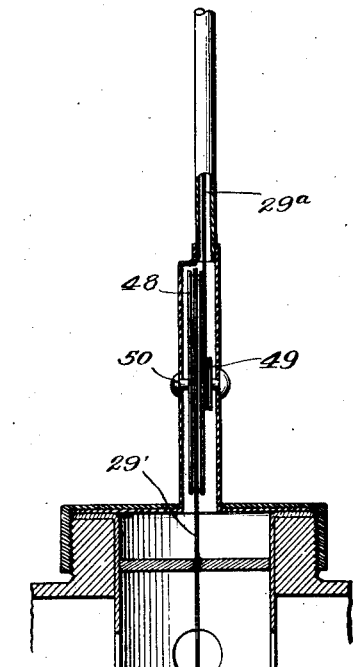
Inventor
Earl F. Pierce
By Pierce & Sweet
attys

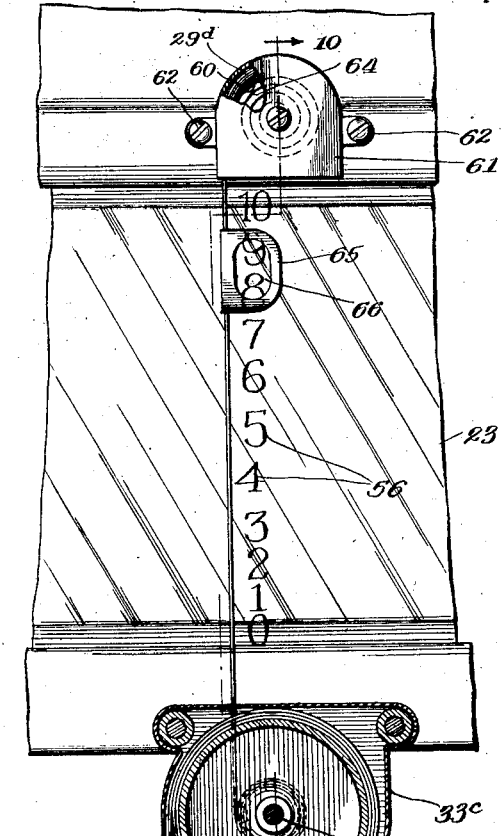
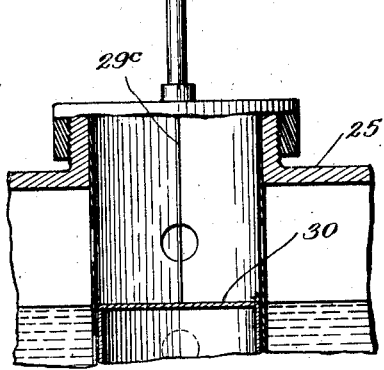
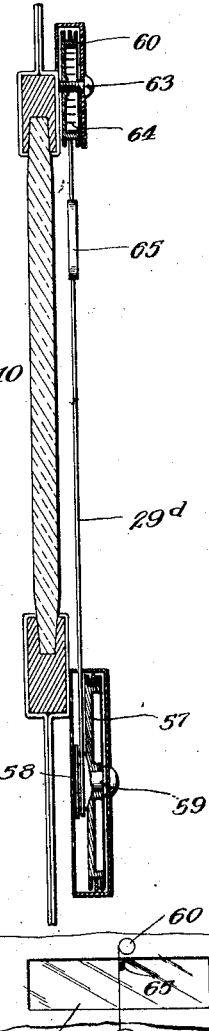
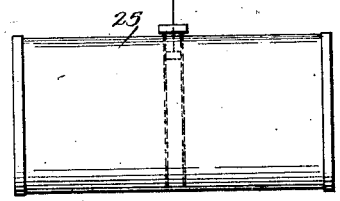

Patented Mar. 20, 1928.

1,663,484

UNITED STATES PATENT OFFICE.

EARL F. PIERCE, OF WINNETKA, ILLINOIS; CENTRAL TRUST COMPANY OF ILLINOIS, ADMINISTRATOR OF SAID EARL F. PIERCE, DECEASED, ASSIGNOR TO FLORENCE E. PIERCE.

LIQUID-LEVEL GAUGE.

Application filed September 26, 1925. Serial No. 58,856.

My invention relates to improvements in gauges and is particularly concerned with improvements in gauges for use on automotive vehicles for indicating the amount of fuel in the fuel tank.

The objects of my present invention are:

First, to provide a novel gauge in which there is a minimum amount of resistance between the moving parts of the mechanism and the other relatively stationary parts, whereby the sensitivity and accuracy of the gauge are enhanced;

Second, to provide a gauge, such as described, in which the connecting means between the level actuated means in the fuel tank and the indicating means is simple in character;

Third, to provide a gauge, such as described, in which the connection between the level actuated means in the fuel tank and the indicating means is as short as possible;

Fourth, to provide a gauge in which optical means are employed to enable the driver of the vehicle to see the indications at the rear thereof without turning to look backwards.

Fifth, to provide a gauge comprising indicating means that can be observed from the interior or exterior of the car with equal facility; and Sixth, to provide a gauge, such as described, that is simple in construction, economical to manufacture and not liable to get out of order.

Other objects of my invention will appear as this description progresses, reference being had to the accompanying drawings, in which:

Figure 1 is a side elevation of an automobile equipped with my invention;

Figure 2 is a vertical, transverse section taken on the line 2—2 of Fig. 3;

Figure 3 is a vertical section taken on the line 3—3 of Figure 2, none of the gearing being shown in section;

Figure 3ª is a similar vertical section, on an enlarged scale, all parts on shaft 37 being shown in section.

Figure 4 is a more or less diagrammatic view showing the relative positions of the level indicating means and the indicator actuating means;

Figure 5 is a section, on an enlarged scale, taken on line 5—5 of Figure 3ª;

Figure 6 is a view somewhat similar to Figure 4 but showing a modified form of my invention;

Figure 7 is a longitudinal section on the line 7—7 of Figure 6;

Figure 8 is a diagrammatic view indicating, schematically, another embodiment of my invention;

Figure 9 is a view, partially in elevation and partially in section, of another embodiment of my invention; and Figure 10 is a vertical section on the line 10—10 of Figure 9.

Throughout the several views similar reference characters are used for referring to similar parts and the several sectional views are taken looking in the directions of the small arrows used in connection with the section lines.

Most of the dash gauges for indicating the level of the fuel in the fuel tank of an automobile that are in use today comprise a Bowden cable that extends from the rear fuel tank to the indicating means on the dash board of the automobile. Due to the fact that this cable is comparatively long and that it contains several more or less abrupt curves, the friction between the stationary part of the cable and the movable element is considerable. This friction increases with the age of the car until, as is generally the case, the gauge ceases entirely to operate. One of the objects of my invention is, as stated above, to reduce this friction to a minimum and to so construct the gauge that there is little likelihood of this friction ever increasing, so that the gauge will continue correctly to indicate the level of the fuel in the fuel tank.

On the cheaper cars that are manufactured today there is either no gas gauge on the fuel tank, or the indicating means is mounted directly upon the tank so that it is necessary for the driver to get out of the car to observe the quantity of fuel in the tank. This gauge upon the fuel tank is, however, of use to the attendants at filling stations because it enables such attendants to determine when the tank is filled with fuel.

In some of the better grades of automobiles there is a gauge, an indicator upon the fuel tank and also on the dash, so that both the operator of the car and the attendant at the filling station can observe the quantity of fuel in the tank. With my present invention one gauge performs both of these functions because it can be seen with equal facility by the operator of the car and by the attendant filling the tank.

In the embodiment of my invention disclosed in Figure 1 I have illustrated an automobile comprising the body 20 having the front seat 21, the top 22 provided with a rear window 23, and a rear view mirror 24 mounted upon the windshield. At 25 is indicated the fuel tank which is positioned substantially directly below the rear window 23.

A perforated tube 26 is secured in the fuel tank at substantially its middle point and extends upwardly through the top side of the fuel tank, as shown in Figure 4. The upper end of the tube is provided with a cap 27 with which is connected the lower end of the small tube 28. A cable 29, which should be quite flexible, has one end secured to a float 30, of suitable construction, that slides in the perforated tube 26 and maintains a level substantially the same as the level of the fuel in the tank 25.

The tube 28 is preferably positioned between the rear end wall 31 of the automobile body and the upholstery of the rear seat 32 and connects with the lower, reduced end portion 33′ of the housing 33 for the indicator mechanism. This housing may be secured to the lower rail 34 of the rear window by means of screws 35, or in any other suitable manner, and contains mechanism for reducing the movement imparted from the float 30 before it is communicated to the indicating means proper. This reducing mechanism comprises the groove pulley 36 upon which the cable 29 can wind. This pulley is rotatably mounted upon the shaft 37 which has one end 38 rigidly secured in the cover 33ª of the housing. A spiral spring 39 is housed in the pulley 36 and has one end secured to the shaft 37. The other end of the spring is secured to the rim of the pulley by means of a rivet 40 (see Figure 5) or in any other desired manner.

A pinion 41 is formed integrally with, or otherwise rigidly secured to, the pulley 36 and both the pulley and the pinion 41 are rotatably mounted upon the shaft 37. The pinion 41 meshes with a gear 42 rigidly secured upon the shaft 43. The latter is rotatably mounted in opposite walls of the housing and has rigidly mounted thereon the pinion 44. This pinion meshes with the gear 45. This gear is rotatably mounted upon the shaft 37 and has a hub 46 that extends outwardly through one wall of the housing and carries the pointer, or indicator, 47. Preferably, this pointer is provided with a rounded head 47′.

From the above description it will be apparent that the movement imparted by the float 30 can be so reduced as to cause the pointer, or indicator, 47 to make one half of a revolution while the float 30 is moving from the top to the bottom of the fuel tank, or vice versa. Suitable indicia may be placed upon the rear window to enable the operator to determine the level of the fuel in the tank. It will, of course, be understood that as the float rises, the spring 39 will turn the pulley 36 in a proper direction to take up the slack in the cable 29, but this spring does not have sufficient tension to lift the float from the surface of the fuel. The float will, of course, have sufficient weight to tension the spring 39 as the float descends in the tank. The purpose of the perforated tube 26 is to act as a guide for the float 30 and further to maintain a body of quiescent fuel having a level that is substantially the average level of the fuel in the tank 25.

The operator, by looking into the rear vision mirror 24, can readily perceive the position of the indicator head 47′ and thus determine the quantity of fuel in the tank, and an attendant filling the tank can look through the rear window and similarly determine how full the tank is. By reason of the fact that in many automobiles the indicator will be positioned almost directly over the fuel tank, there will be practically no curve in the tube 28 and the frictional resistance to the movement of the cable 29 will, therefore, be reduced to a minimum.

In that embodiment of my invention shown in Figures 6 and 7 the reduction mechanism is located in the hollow extension 27′ of the cap 27 and comprises two pulleys 48 and 49, respectively, rigidly connected together and mounted upon the shaft 50 that extends transversely of the housing extension 27′. A cable 29′ connects the float 30 with the pulley 48 and a second cable 29ª connects the small pulley 49 with a third pulley 51 rotatably mounted upon the shaft 52 in the housing 53 which, in this case, comprises one wall 53′ made of celluloid, xylonite or other suitable transparent material, and in this case the pointer, or indicator, 54 is connected directly to the pulley 51. This pulley houses a spring 55 having one end secured to the pulley and the other end secured to the shaft 52. In this construction, as the float 30 moves upwardly, slack is developed in the cable 29' and the spring 55, pulling upon the cable 29ª, causes the pulleys 51, 49 and 48 to rotate until the slack in both the cables 29' and 29ª is taken up. In this case, as in the previous one, the weight of the float 30 is sufficient to tension the spring 55 but the tension of this spring is insufficient to lift the float from the surface of the fuel in the tank.

In that embodiment of my invention shown in Figures 8, 9 and 10, the full up and down dimension of the rear window is used as an indicating scale, indicia numbers 56 being printed thereon to indicate the level of the fuel or the quantity of the fuel in the tank. In this embodiment of my invention the cable 29ᶜ connects the float 30 and a large pulley 57 carried in the housing 33ᶜ, secured to the lower rail of the rear window. A smaller pulley 58 is integrally formed with, or otherwise rigidly secured to, the pulley 57 and both of these pulleys are mounted upon a shaft 59 carried by the housing 33ᶜ. A cable 29ᵈ connects the small pulley 58 with a third pulley 60 carried by a housing 61, secured by means of screws 62, or in any other desired manner, to the upper rail of the rear window. This pulley is rotatably mounted upon a screw 63, or a suitable shaft, and houses a spring 64, one end of which is secured to the screw 63 and the other end of which is secured to the rim of the pulley 60. An indicator 65 is secured to the cable 29ᵈ and moves over the indicia 56. This indicator may be provided with an opening 66 through which the indicia can be read.

In the last described embodiment of my invention the sizes of the pulleys 57 and 58 are such that when the float 30 moves from the top to the bottom of the tank, the indicator 65 will move from the top to the bottom of the window. Any slack developed in either of the cables will immediately be taken up through the action of the spring 64 upon the pulley 60.

From the above description it will be apparent that I have provided a gauge that is simple in construction, economical to manufacture, free from excessive friction and not likely to get out of order. It will also be apparent that the indicator of this gauge can be seen either from the exterior or the interior of the car. It should, however, be noted that the rear vision mirror 24 may be dispensed with. This simply means that the operator, in order to observe the position of the indicator, need merely turn his head.

While I have described the details of construction of the preferred embodiment of my invention, it is to be clearly understood that my invention is not limited to these details but is capable of other adaptations and modifications within the scope of the appended claims.

Having thus described my invention, what I claim is:

1. The combination with an automobile having a rear window and a fuel tank at the rear, of movable means in said tank responsive to the depth of fuel therein, an indicating device silhouetted against said window, said indicating devices having a smaller range of movement than said depth-responsive means, and means for connecting said depth responsive means with said indicating devices comprising means located adjacent said window for compensating for the differences in the range of movement of said indicating device and said depth-responsive means.

2. The combination with an automobile having a rear window and a fuel tank at the rear, of movable means in said tank responsive to the depth of fuel therein, an indicating device silhouetted against said window, said indicating devices having a smaller range of movement than said depth responsive means, and means for connecting said depth responsive means with said indicating devices comprising means for compensating for the differences in the range of movement of said indicating device and said depth-responsive means.

3. The combination with an automotive vehicle comprising a body having a rear window, a fuel tank below said rear window, and a driver's seat, of means in said tank responsive to changes in the level of the fuel therein, a movable indicating device adjacent and silhouetted against said window, and means for connecting said first-named means with said indicating device.

4. The combination with an automotive vehicle comprising a body having a rear window, and a fuel tank below said rear window, of means in said tank responsive to changes in the level of the fuel therein, an indicating device adjacent said window and having a movable indicator member silhouetted against the window and means operatively connecting said device with said level-responsive means.

5. The combination with an automotive vehicle comprising a body having a rear window, a fuel tank adjacent the rear end of said body, and a driver's seat, of means in said tank responsive to changes in the level of the fuel therein, and an indicating device located to the rear of the driver's seat and visible in outline by one occupying said seat and looking through the rear window, said device being operatively connected with said fuel level-responsive means.

6. The combination with an automotive vehicle having a rear window and a fuel tank at the rear, of movable means in said fuel tank responsive to changes in the level of the fuel therein, an indicating device silhouetted against the rear window, and connections between said level responsive means and said indicating device.

7. The combination with an automotive vehicle having a fuel tank and a window above said tank, of an indicating device silhouetted against said window and visible from both sides thereof, fuel level responsive means in said tank and means connecting the level-responsive means with the indicating device to cause the indicating device to move with variations in the fuel level.

In witness whereof, I hereunto subscribe my name this 23d day of September, 1925.

EARL F. PIERCE.